United States Patent [19]
Saito

[11] Patent Number: 5,102,504
[45] Date of Patent: Apr. 7, 1992

[54] DEVICE FOR SOLVENT RECOVERY IN AN ULTRASONIC CLEANING DEVICE

[76] Inventor: Tetsuya Saito, 294-39 Nakakugi, Omiya-city, Saitama 331, Japan

[21] Appl. No.: 554,063

[22] Filed: Jul. 12, 1990

Related U.S. Application Data

[63] Continuation of Ser. No. 425,234, Oct. 23, 1989, abandoned.

[51] Int. Cl.⁵ ............................................... B01D 3/10
[52] U.S. Cl. ........................... 202/170; 68/18 C; 68/18 F; 134/107; 134/108; 134/111; 134/184; 159/32; 159/47.3; 159/901; 202/182; 202/185.1; 202/200; 202/202; 202/205; 203/94; 203/98; 203/DIG. 14
[58] Field of Search ............... 202/182, 200, 170, 202, 202/205, 185.1; 203/DIG. 9, 97, 98, 94, 40, DIG. 14; 134/107, 108, 111, 184; 68/18 C, 18 R, 18 F; 159/32, 47.3, 901

[56] References Cited

U.S. PATENT DOCUMENTS

| | | | |
|---|---|---|---|
| 2,423,307 | 7/1947 | Fraser, Jr. et al. | 202/174 |
| 3,468,761 | 9/1969 | Stalcup | 203/DIG. 14 |
| 3,713,987 | 1/1973 | Low | 134/184 |
| 4,103,519 | 8/1978 | Davidson | 68/18 F |
| 4,332,092 | 1/1982 | Hansotte | 34/27 |
| 4,438,730 | 3/1984 | Link et al. | 203/DIG. 14 |
| 4,442,852 | 4/1984 | Lord | 134/184 |
| 4,613,412 | 9/1986 | MacDermid | 203/DIG. 18 |
| 4,690,158 | 9/1987 | Yamada et al. | 202/170 |
| 4,693,786 | 9/1987 | Brett et al. | 202/170 |
| 4,778,535 | 10/1988 | McCord | 202/170 |
| 4,865,060 | 9/1989 | Shibano | 134/184 |
| 4,865,061 | 9/1989 | Fowler et al. | 134/184 |

FOREIGN PATENT DOCUMENTS

| | | | |
|---|---|---|---|
| 0706439 | 12/1979 | U.S.S.R. | 203/DIG. 14 |
| 1313997 | 4/1973 | United Kingdom | 203/DIG. 14 |

*Primary Examiner*—Virginia Manoharan
*Attorney, Agent, or Firm*—John F. Ohlandt

[57] ABSTRACT

A device for solvent recovery in an ultrasonic cleaning machine is based on utilization of the negative pressure originating from the liquification of the solvent vapor itself in a heat exchanger and the negative pressure from an ejector. Thus, the solvent vapor in a vapor zone is led out of a distillation vessel, cooled outside of the vessel, liquidfied, once again returned to a solvent vessel and, at the same time, the liquification of the solvent vapor which is incompletely liquified from this cooling and liquification process is accelerated even more in the negative pressure section of the ejector. Accordingly, the amount of water mixed into the recovered solvent is extremely reduced so that satisfactory cleaning in the ultrasonic cleaner can be ensured.

2 Claims, 2 Drawing Sheets

DEVICE FOR SOLVENT RECOVERY IN AN ULTRASONIC CLEANING DEVICE

This application is a continuation of application Ser. No. 425,234, filed Oct. 23, 1989, now abandoned.

BACKGROUND OF THE INVENTION

1. Field of the Invention

The present invention relates to a method and device for solvent recovery in an ultrasonic cleaning machine, which method and device can effectively liquify and recover solvent vapors.

2. Description of the Prior Art

Conventional solvent recovery methods will be explained with reference to FIG. 2(a) and FIG. 2(b).

FIG. 2(a) is an explanatory drawing relating to a first conventional solvent recovery method. The system used comprises a distillation vessel DV, a heater H, a freeboard FB which forms a channel d in the outer peripheral edge of the distillation vessel DV, a cooling coil C attached to the inner peripheral wall of the freeboard FB and connected to a refrigerating machine (omitted from the drawing), and a solvent R.

The solvent R heated by the heater H is gradually converted to vapor and evaporates upward to be cooled by the cooling coil C and liquified. The liquid solvent then drips down into the channel d to be recovered. At the same time that the solvent vapor is liquified to give the recovered solvent R, the water vapor in the air is liquified and separated out in a moisture separator (not shown in the drawing) before the solvent R is returned to the specified solvent vessel.

FIG. 2(b) is an explanatory drawing relating to a second conventional solvent recovery method. The members which perform the same functions as those in FIG. 2(a) carry the same code numbers.

This second method is usually used for the solvent freon which ceases to give off vapor at $-15°$ C. The cooling coil C is duplicated to cool the solvent vapor as far as possible to $-15°$ C. to prevent the vapor from escaping from the vessel. Otherwise the method is identical to the first conventional method in which the vapor is cooled by the respective cooling coil C and liquified, after which the liquid drips down into the channel d from which the solvent R is recovered and returned to the specified solvent vessel via the moisture separator.

In both the first and second conventional methods the solvent vapor is cooled and liquified by the cooling coil C which is positioned at the peripheral edge of the vapor zone. To prevent the solvent vapor from escaping from the solvent vessel, the height of the normal freeboard FB must be 1.5 times the width of the open section. This gives rise to the drawback that the device is generally very high. In particular, although the second conventional method is comparatively effective in preventing the escape of the solvent vapor, the device has the cooling coil built up in two stages, which unavoidablely enlarges the longitudinal dimension of the device.

In addition, the relationship between the amount of solvent vapor generated and the amount of solvent vapor cooled and liquified by the cooling coil C is occasionally subjected to momentary changes related to the intermittent operation of the refrigerating machine (omitted from the drawings), to changes in the amount of heating by the heater H, to changes in the ambient temperature, and to changes in other conditions. Accordingly, when the amount of solvent vapor generated is small compared to the amount of solvent vapor cooled and liquified, specifically, when the height of the solvent distillation zone is small, the cooling coil C is exposed to the air in the upper zone of the solvent vapor, and, because the moisture in the air is condensed, the ratio of moisture mixed into the recovered solvent is high. This results in the drawback of unsatisfactory cleaning in the ultrasonic cleaner because of the water present. This problem is particularly remarkable in the second conventional method in which the cooling and liquifying capacity is increased. On the other hand, if the amount of solvent vapor generated is larger than the amount of solvent vapor cooled and liquified, the height of the solvent vapor zone is greater than the height of the cooling coil C. In such a case the solvent vapor escapes from the vessel so that it is difficult to completely recover the solvent vapor.

SUMMARY OF THE INVENTION

An object of the present invention is to provide, with due consideration to the drawbacks of such conventional methods and devices, a method and device for solvent recovery in an ultrasonic cleaning machine whereby the ratio of moisture mixed into the recovered solvent is extremely low.

This object is satisfied in the present invention by the provision of a method and device for solvent recovery in an ultrasonic cleaning machine whereby, utilizing the negative pressure originating from the liquification of the solvent vapor itself and the negative pressure from an ejector, the solvent vapor in a vapor zone is led out of a system, cooled outside of the system, liquified, and once again returned to a solvent vessel. At the same time, the liquification of the solvent vapor which is incompletely liquified from this cooling and liquification process is further accelerated in the negative pressure section of the ejector.

Another object of the present invention is to provide a device for solvent recover in an ultrasonic cleaning machine comprising:

a solvent vessel for receiving a liquid solvent; an open-topped distillation vessel for receiving the liquid solvent, said distillation vessel being in fluid connection with said solvent vessel and being provided with a heater for evaporating the liquid solvent therein; an ejector for evacuating solvent vapor from said distillation vessel; a heat exchanger located outside said distillation vessel for condensing said solvent vapor; means for maintaining the height of a vapor zone situated above the liquid solvent in the distillation vessel, said means including a first pipeline, having its inlet portion disposed on the wide wall of said distillation vessel above the liquid solvent level, for transporting the solvent vapor to said heat exchanger, a negative pressure component being produced by the condensation of the solvent vapor in said heat exchanger in proportion to the height of the vapor zone, whereby an extremely low ratio of moisture mixed with the solvent is obtained; a second, condensate pipeline with its inlet and outlet portions communicating respectively with said heat exchanger and said solvent vessel for transporting the condensate directly from said heat exchanger to said solvent vessel; a third pipeline connected in fluid communication with said heat exchanger for transporting incompletely liquified solvent vapor in said heat exchanger to said ejector; and a fourth, circulatory pipeline having its inlet and outlet portions communicating with said solvent vessel, said circulatory pipeline being connected in series to a filter, a pump, and said ejector, said filter being located between said inlet portion and said pump for removing waste from said liquid solvent, said pump being located upstream of said ejector for pumping said solvent for circulation and providing said solvent with a forced flow to actuate said ejector; said ejector being located upstream of said outlet portion for creating an additional negative pressure component in said heat exchanger for evacuating the solvent vapor from the vapor zone of said distillation vessel.

BRIEF DESCRIPTION OF THE DRAWINGS

These and other, objects, features, and advantages of the present invention will become more apparent from the following description of the preferred embodiments taken in conjunction with the accompanying drawings, in which.

DETAILED DESCRIPTION OF THE INVENTION AND PREFERRED EMBODIMENTS

The configuration by which the solvent vapor in the vapor zone is led out of the distillation vessel and cooled has the effect of reducing the height of the device; the configuration by which the solvent vapor which is incompletely liquified from this cooling and liquification process is led to the negative pressure section of the ejector has the effect of completely liquifying the solvent vapor without the addition of special devices; and the configuration by which the solvent vapor is led outside of the system utilizing negative pressure caused by the liquification of the solvent vapor itself has the effect of avoiding the contamination of moisture with the recovered solvent.

Figure 1:
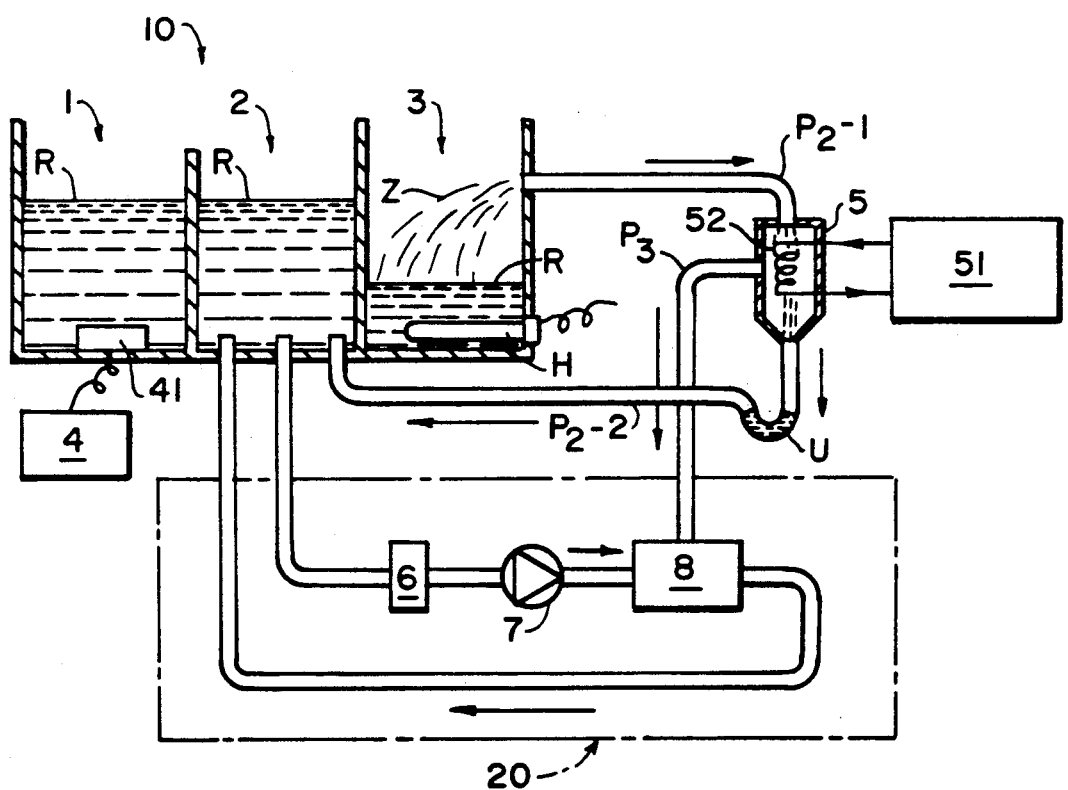
FIG. 1 is a sectional front elevation showing the configuration of an embodiment of the present invention, and FIG. 2(a) and (b) are sectional front elevations showing one part of the respective conventional examples.
Figure 2A:
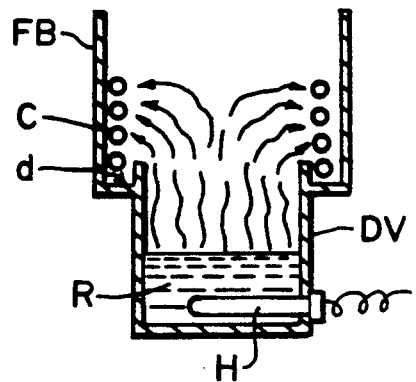
Figure 2B:
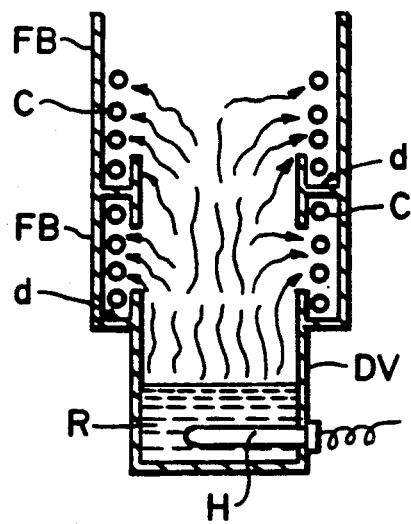

An embodiment of the present invention will now be explained with reference to FIG. 1.

Shown in the drawing are a main body 10 of an ultrasonic cleaning machine, a solvent forced circulation circuit 20, and a heat exchanger 5. The solvent forced circulation circuit 20 and the heat exchanger 5 can be provided at any position outside the main body 10 of the ultrasonic cleaning machine, so that the height of the main body 10 may be low.

The body 10 of the ultrasonic cleaning machine comprises three tanks, i.e, an ultrasonic cleaning tank 1 provided with an ultrasonic oscillating element 41 activated by an ultrasonic oscillator 4, a solvent tank 2, and a distillation tank 3 provided with a heater H. The solvent forced circulation circuit 20 comprises a filter 6, a pump 7, and an ejector 8. The cooling coil of the heat exchanger 5 is connected to a refrigerator 51.

The structure of the solvent forced circulation circuit 20 is the primary feature of the present invention. Specifically, whereas the solvent recycle circuit of devices of the prior arts previously mentioned is little more than a filter 6, for filtering out dirt and the like in the solvent, and a pump 7, to the present invention there is added the ejector 8 in which a negative pressure is created when the solvent in the solvent tank 2 is transported by the pump 7 and emitted through the ejector 8.

In addition, as is clearly shown by a comparison of the drawings, the circuit related to the heat exchanger 5 is also a distinctive feature of the present invention. Specifically, on the upper part of the heat exchanger 5, one end of a pipe $P_{2-1}$ constructed as a first pipeline is open, while the other end of the pipe $P_{2-1}$ opens into one location, or is split to open into a plurality of locations, in the wall of the distillation tank 3. Also, on the lower part of the heat exchanger 5, one end of a pipe $P_{2-2}$ constituting the second pipeline is open, while the other end of the pipe $P_{2-2}$ opens into the solvent tank 2 through a U-shaped trap U. One end of a pipe $P_3$ of a third pipeline opens into the wall surface of the center section of the heat exchanger 5, while the other end of the pipe $P_3$ opens into the ejector 8 of the solvent forced circulation circuit 20. A fourth circulatory pipeline forms the circuit 20, being connected from the solvent vessel 2 to the filter 6, pump 7, and ejector 8, thence, back to the solvent vessel 2.

Next, the operation of the embodiment of the present invention constructed as outlined above will be explained.

The ultrasonic oscillator 4 is started up, and when the ultrasonic cleaning machine 1 performs the ultrasonic cleaning operation the solvent from the ultrasonic cleaning is transported to the distillation tank 3 where it is heated to boiling by the heater H so that the solvent vapor almost fills the vapor zone Z of the distillation tank 3.

By starting the pump 7 of the solvent forced circulation circuit 20, the solvent in the solvent tank 2 which is transported by the pump 7 is sprayed into the ejector 8 and the resulting negative pressure causes the solvent vapor in the distillation tank 3 to be sucked in, in the direction of the ejector 8, via the pipe $P_{2-1}$, the heat exchanger 5, and the pipe $P_3$. Accordingly, when the solvent vapor passes through the heat exchanger 5, the vapor is cooled and liquified by the cooling coil 52 connected to the refrigerator 51.

If the capacity of the heat exchanger 5 is adequate the solvent vapor inside the heat exchanger 5 is cooled and liquified, and, because of this, a negative pressure is newly created. By means of this negative pressure and the negative pressure created by the ejector 8, the intake, cooling, and liquification of the solvent vapor in the vapor zone Z is performed continuously at an adequate speed. Therefore, the solvent R is liquified and falls dropwise to the bottom section of the heat exchanger 5, then flows out to the pipe $P_{2-2}$ which forms the second pipeline opening into the heat exchanger 5. The solvent R which flows into the pipe $P_{2-2}$ is temporarily stored in the trap U, after which it is recycled to the solvent tank 2 by a suitable means.

When because of a change in the operating conditions the vapor zone Z is too low, the amount of solvent vapor sucked into the pipe $P_{2-1}$ forming the first pipeline is small, so the partial pressure of the solvent vapor in the heat exchanger 5 is low. As a result, the negative pressure to cause the liquification of the solvent vapor in the heat exchanger 5 is not produced, so the suction force is only the suction force which is caused by the negative pressure from the ejector 8 of the solvent forced recycle circuit. In this way, the air is not sucked in as in the case of using a forced suction but acts as though the suction force is controlled in proportion to the height of the vapor zone Z, so that the condensation and incorporation of the moisture from the air is avoided, and it is possible to obtain an extremely low ratio of moisture mixed into the recovered solvent.

Furthermore, the portion of the solvent vapor flowing into the heat exchanger 5 which is not completely liquified by means of the cooling coil 52 is sucked into the pipeline P3 which opens into the middle wall surface of the heat exchanger 5. The solvent vapor cooled up to the point immediately before this liquification is further liquified by the negative pressure of this suction and is completely liquified in the ejector 8. It is then recycled to the solvent tank 2 together with the recycle of the solvent cleaned up in the filter 6 provided in the first pipeline.

In the present invention, because a configuration has been adopted by which the solvent vapor is directly led from the vapor zone of the body of the solvent tank to the outside of the system, it is possible to construct a lower device. Furthermore, because liquification is obtained through two stages of cooling and subjection to negative pressure, the complete recovery of the solvent is possible. In addition, because the intake of the solvent vapor is controlled in proportion to the amount of solvent vapor, air is not taken in, the condensation and incorporation of moisture in the air is avoided, and the ratio of moisture mixed into the recovered solvent is extremely low.

Obviously, numerous modifications and variations of the present invention are possible in light of the above teachings. It is therefore to be understood that within the scope of the appended claims, the invention may be practiced otherwise than as specifically described herein.

What is claimed is:

1. A device for solvent recovery in an ultrasonic cleaning apparatus comprising:
   a solvent vessel for receiving a liquid solvent;
   an open-topped distillation vessel for receiving the liquid solvent, said distillation vessel being in fluid connection with said solvent vessel and being provided with a heater for evaporating the liquid solvent therein;
   an ejector for evacuating solvent vapor from said distillation vessel;
   a heat exchanger located outside said distillation vessel for condensing said solvent vapor;
   means for maintaining the height of a vapor zone situated above the liquid solvent in the distillation vessel, said means including a first pipeline, having its inlet portion disposed on the side wall of said distillation vessel above the liquid solvent level, for transporting the solvent vapor to said heat exchanger, a negative pressure component being produced by the condensation of the solvent vapor in said heat exchanger in proportion to the height of the vapor zone, whereby an extremely low ratio of moisture mixed with the solvent is obtained;
   a second, condensate pipeline with its inlet and outlet portions communicating respectively with said heat exchanger and said solvent vessel for transporting the condensate directly from said heat exchanger to said solvent vessel;
   a third pipeline connected in fluid communication with said heat exchanger for transporting incompletely liquified solvent vapor in said heat exchanger to said ejector; and
   a fourth, circulatory pipeline having its inlet and outlet portions communicating with said solvent vessel, said circulatory pipeline being connected in series to a filter, a pump, and said ejector, said filter being located between said inlet portion and said pump for removing waste from said liquid solvent, said pump being located upstream of said ejector for pumping said solvent for circulation and providing said solvent with a forced flow to actuate said ejector;
   said ejector being located upstream of said outlet portion for creating an additional negative pressure component in said heat exchanger for evacuating the solvent vapor from the vapor zone of said distillation vessel.

2. The device for solvent recovery in an ultrasonic cleaning apparatus according to claim 1, wherein said second condensate pipeline includes a U-shaped trap disposed between said heat exchanger and said solvent vessel.

* * * * *